(12) United States Patent
Stuckey et al.

(10) Patent No.: US 11,760,136 B2
(45) Date of Patent: Sep. 19, 2023

(54) TIRE WITH MULTI-LAYER INSERT

(71) Applicant: Bridgestone Americas Tire Operations, LLC, Nashville, TN (US)

(72) Inventors: Jon I. Stuckey, Uniontown, OH (US); Bradley S. Plotner, Akron, OH (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 116 days.

(21) Appl. No.: 17/053,515

(22) PCT Filed: Apr. 18, 2019

(86) PCT No.: PCT/US2019/028152
§ 371 (c)(1),
(2) Date: Nov. 6, 2020

(87) PCT Pub. No.: WO2019/221874
PCT Pub. Date: Nov. 21, 2019

(65) Prior Publication Data
US 2021/0221184 A1    Jul. 22, 2021

Related U.S. Application Data

(60) Provisional application No. 62/671,679, filed on May 15, 2018.

(51) Int. Cl.
*B60C 19/00* (2006.01)
(52) U.S. Cl.
CPC .................. *B60C 19/002* (2013.01)
(58) Field of Classification Search
CPC ..................................................... B60C 19/002
See application file for complete search history.

(56) References Cited

U.S. PATENT DOCUMENTS

| | | | |
|---|---|---|---|
| 6,726,289 B2 | 4/2004 | Yukawa et al. |
| 6,729,373 B2 | 5/2004 | Yukawa et al. |
| 6,755,483 B2 | 6/2004 | Yukawa et al. |
| 6,880,597 B2 | 4/2005 | Yukawa et al. |

(Continued)

FOREIGN PATENT DOCUMENTS

| | | |
|---|---|---|
| DE | 102009024454 | 12/2010 |
| DE | 102011053686 | 3/2013 |

(Continued)

OTHER PUBLICATIONS

Imaoka, English Machine Translation of JP 2006182280, 2006 (Year: 2006).*

(Continued)

*Primary Examiner* — Robert C Dye
*Assistant Examiner* — Brendon Charles Darby
(74) *Attorney, Agent, or Firm* — Shaun J. Fox; Bryan J. Jaketic

(57) ABSTRACT

A noise damper includes an open cell foam having a circumferential first tier and an interposed circumferential second tier including blocks and voids. The first tier has a radial height that is 3.0-8.0% of a section height and a first axial width. The second tier has a radial height that is 3.0-12.0% of a section height and a second axial width. The blocks span 10-30% of the second tier's inner circumference and the voids span 70-90% of the second tier's inner circumference.

10 Claims, 5 Drawing Sheets

(56) References Cited

U.S. PATENT DOCUMENTS

| | | |
|---|---|---|
| 6,935,391 B2 | 8/2005 | Naito et al. |
| 7,013,940 B2 | 3/2006 | Tsihlas |
| 7,140,412 B2 | 11/2006 | Tanno |
| 7,182,114 B2 | 2/2007 | Yukawa |
| 7,188,652 B2 | 3/2007 | Yukawa |
| 7,195,683 B2 | 3/2007 | Naito et al. |
| 7,213,624 B2 | 5/2007 | Yukawa et al. |
| 7,347,239 B2 | 3/2008 | Yukawa et al. |
| 7,387,141 B2 | 6/2008 | Tanno et al. |
| 7,389,802 B2 | 6/2008 | Kanz et al. |
| 7,490,644 B2 | 2/2009 | Yukawa |
| 7,556,075 B2 | 7/2009 | Tanno |
| 7,581,577 B2 | 9/2009 | Tanno |
| 7,665,495 B2 | 2/2010 | Tanno et al. |
| 7,669,628 B2 | 3/2010 | Yukawa |
| 7,681,611 B2 | 3/2010 | Ikeda et al. |
| 7,681,613 B2 | 3/2010 | Yukawa et al. |
| 7,694,707 B2 | 4/2010 | Agostini et al. |
| 7,703,858 B2 | 4/2010 | Yukawa |
| 7,717,146 B2 | 5/2010 | Yukawa et al. |
| 7,735,532 B2 | 6/2010 | Tanno et al. |
| 7,743,808 B2 | 6/2010 | Yukawa |
| 7,823,613 B2 | 11/2010 | Tanno et al. |
| 7,854,244 B2 | 12/2010 | Tanno |
| 7,874,329 B2 | 1/2011 | Tanno |
| 7,886,788 B2 | 2/2011 | Yukawa |
| 7,886,789 B2 | 2/2011 | Yukawa et al. |
| 7,975,740 B2 | 7/2011 | Yukawa |
| 8,028,796 B2 | 10/2011 | Ishihara |
| 8,033,309 B2 | 10/2011 | Yukawa et al. |
| 8,136,560 B2 | 3/2012 | Tanno |
| 8,151,930 B2 | 4/2012 | Yukawa |
| 8,220,515 B2 | 7/2012 | Aoki et al. |
| 8,281,834 B2 | 10/2012 | Yukawa |
| 8,342,289 B2 | 1/2013 | Tanno |
| 8,365,782 B2 | 2/2013 | Tanno et al. |
| 8,376,006 B2 | 2/2013 | Tanno |
| 8,387,670 B2 | 3/2013 | Tanno et al. |
| 8,430,143 B2 | 4/2013 | Tanno |
| 8,448,743 B2 | 5/2013 | Tanno et al. |
| 8,544,510 B2 | 10/2013 | Yukawa |
| 8,776,851 B2 | 7/2014 | Majumdar |
| 8,839,905 B2 | 9/2014 | Layfield et al. |
| 8,888,939 B2 | 11/2014 | Bormann |
| 8,905,099 B2 | 12/2014 | Tanno |
| 8,915,276 B2 | 12/2014 | Yukawa |
| 8,945,322 B2 | 2/2015 | Tanno |
| 8,960,251 B2 | 2/2015 | Tanno |
| 8,997,805 B2 | 4/2015 | Tanno |
| 8,997,806 B2 | 4/2015 | Tanno |
| 9,034,935 B2 | 5/2015 | Tomiyama et al. |
| 9,045,006 B2 | 6/2015 | Dautrey et al. |
| 9,180,741 B2 | 11/2015 | Oba |
| 2005/0155686 A1 | 7/2005 | Yukawa et al. |
| 2005/0275277 A1 | 12/2005 | Yukawa |
| 2007/0017619 A1 | 1/2007 | Yukawa |
| 2007/0131327 A1 | 6/2007 | Yukawa et al. |
| 2009/0053492 A1 | 2/2009 | Tanno et al. |
| 2009/0090446 A1 | 4/2009 | Keda et al. |
| 2009/0151837 A1 | 6/2009 | Uhlenbruch |
| 2009/0308519 A1 | 12/2009 | Ishihara |
| 2009/0308523 A1 | 12/2009 | Kuramori |
| 2009/0314402 A1 | 12/2009 | Kuramori et al. |
| 2010/0154966 A1 | 6/2010 | Agostini et al. |
| 2011/0308677 A1 | 12/2011 | Kamprath et al. |
| 2011/0308704 A1 | 12/2011 | Sandstrom et al. |
| 2011/0308705 A1 | 12/2011 | Sandstrom et al. |
| 2012/0000588 A1 | 1/2012 | Tanno et al. |
| 2012/0073717 A1 | 3/2012 | Agostini et al. |
| 2012/0125507 A1 | 5/2012 | Bormann et al. |
| 2012/0125525 A1 | 5/2012 | Majumdar et al. |
| 2012/0136085 A1 | 5/2012 | Choi et al. |
| 2013/0032262 A1 | 2/2013 | Bormann et al. |
| 2013/0048180 A1 | 2/2013 | Song et al. |
| 2013/0048181 A1 | 2/2013 | Benoit |
| 2013/0087267 A1 | 4/2013 | Sandstrom et al. |
| 2013/0160914 A1 | 6/2013 | Oba |
| 2013/0248071 A1 | 9/2013 | Tanno et al. |
| 2013/0248080 A1 | 9/2013 | Tanno et al. |
| 2014/0014248 A1 | 1/2014 | Parfondry et al. |
| 2014/0020806 A1 | 1/2014 | Greverie et al. |
| 2014/0039076 A1 | 2/2014 | Katayama et al. |
| 2014/0166179 A1 | 6/2014 | Watanabe et al. |
| 2014/0216624 A1 | 8/2014 | Watanabe et al. |
| 2014/0224400 A1 | 8/2014 | Watanabe et al. |
| 2014/0295177 A1 | 10/2014 | Majumdar |
| 2015/0151592 A1 | 6/2015 | Parfondry et al. |
| 2015/0306922 A1 | 10/2015 | Kim et al. |
| 2016/0068030 A1 | 3/2016 | Watanabe |
| 2016/0159143 A1 | 6/2016 | Kierzkowski et al. |
| 2018/0065426 A1* | 3/2018 | Yurjevich ............. B60C 19/002 |
| 2019/0100061 A1* | 4/2019 | Yukawa ................ B60C 19/002 |

FOREIGN PATENT DOCUMENTS

| | | |
|---|---|---|
| EP | 1795377 A2 | 6/2007 |
| EP | 1795377 A3 | 4/2008 |
| JP | 2003-048407 | 2/2003 |
| JP | 2006-182280 | 7/2006 |
| JP | 2014-141109 | 8/2014 |
| KR | 10-2010-0005511 | 1/2010 |
| WO | WO2008142914 A1 | 11/2008 |
| WO | WO2009001779 A1 | 12/2008 |
| WO | WO2009063723 A1 | 5/2009 |
| WO | WO2014038207 A1 | 3/2014 |
| WO | WO2014064896 A1 | 5/2014 |
| WO | WO2015076383 A1 | 5/2015 |
| WO | WO2015092497 A1 | 6/2015 |
| WO | WO2015097929 A1 | 7/2015 |
| WO | WO2015115486 A1 | 8/2015 |
| WO | WO2015118707 A1 | 8/2015 |

OTHER PUBLICATIONS

Ishibashi, English Machine Translation of JP 2014141109, 2014 (Year: 2014).*
"A guide to shore hardness: PolyGlobal: Polyurethane UK plastic manufacturer and supplier," PolyGlobal, Sep. 28, 2021. [Online]. Available: https://www.polyglobal.co.uk/a-guide-to-shore-hardness/. [Accessed: Sep. 29, 2022]. (Year: 2018).*
Written Opinion and Search Report; Corresponding PCT Application Serial No. PCT/US2019028152 (filed Apr. 18, 2019); Authorized Officer Chan Yoon Hwang, dated Aug. 2, 2019.
Supplementary European Search Report; Corresponding EP Application Serial No. EP19802990.2; dated Dec. 13, 2021.

* cited by examiner

TIRE WITH MULTI-LAYER INSERT

FIELD OF INVENTION

This disclosure relates to the reduction of noises generated by tires as they contact the road. More particularly, the disclosure relates to devices inserted within tires to reduce such noise, wherein the noise reducing devices move within the tire.

BACKGROUND

Known tire noise dampers are placed within the tire and permanently affixed to a tire innerliner. The dampers may include foam or fibers. The dampers reduce noise within the tire, and thus reduce noise emitted from the tire.

SUMMARY OF THE INVENTION

In one embodiment, a tire and noise damper assembly includes a tire having a first annular bead, a second annular bead, and a body ply extending between the first annular bead and the second annular bead. The tire further includes an innerliner, disposed radially under the body ply and extending axially across a portion of the body ply. The tire also has an annular belt package, disposed radially upward of the body ply and extending axially across a portion of the body ply. The tire further has a circumferential tread disposed radially upward of the annular belt package and extending axially across a portion of the body ply. The tire also includes a first sidewall extending between the first annular bead and a first shoulder and a second sidewall extending between the second annular bead and a second shoulder. The first shoulder is associated with the circumferential tread, and the second shoulder is associated with the circumferential tread. The assembly also includes a noise damper made of an open cell foam and having a continuous circumferential upper tier and an interposed circumferential lower tier including blocks and voids. The interposed circumferential lower tier has a radial height that is 1.5-14.0% of a section height and an axial width that is 20-80% of a tread width. The continuous circumferential upper tier has a radial height that is 1.5-14.0% of the section height and an axial width that is 20-80% of a tread width. The blocks span 20-40% of the continuous circumferential upper tier's inner circumference and the voids span 60-80% of the continuous circumferential upper tier's inner circumference.

In another embodiment, a noise damper includes an open cell foam having a circumferential first tier and an interposed circumferential second tier including blocks and voids. The first tier has a radial height that is 3.0-8.0% of a section height and a first axial width. The second tier has a radial height that is 3.0-12.0% of a section height and a second axial width. The blocks span 10-30% of the second tier's inner circumference and the voids span 70-90% of the second tier's inner circumference.

In yet another embodiment, a noise damper is made of an open cell foam. The noise damper includes a circumferential upper tier and a lower tier having a plurality of blocks spaced apart in a circumferential direction. The upper tier has a radial height that is 3.0-14.0% of a section height and an axial width that is 20-70% of a tread width. The lower tier has a radial height that is 3.0-14.0% of a section height and an axial width that is 20-70% of a tread width. The plurality of blocks span 10-40% of the lower tier's inner circumference. Each of the plurality of blocks includes a leading edge including a polymer with a Rockwell hardness of up to 100 HRR.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Sidewall" as used herein, refers to that portion of the tire between the tread and the bead.

"Tread" as used herein, refers to that portion of the tire that comes into contact with the road or ground under normal inflation and normal load.

"Tread depth" refers to the distance between a top surface of the tread and the bottom of a major tread groove.

"Tread width" refers to the width of the ground contact area of a tread which contacts with the road surface during the rotation of the tire under normal inflation and load.

While similar terms used in the following descriptions describe common tire components, it is understood that because the terms carry slightly different connotations, one of ordinary skill in the art would not consider any one of the following terms to be purely interchangeable with another term used to describe a common tire component.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

Furthermore, to the extent the term "under" is used in the specification or claims, it is intended to mean not only "directly under" but also "indirectly under" where intermediary tire layers or components are disposed between two identified components or layers.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1:
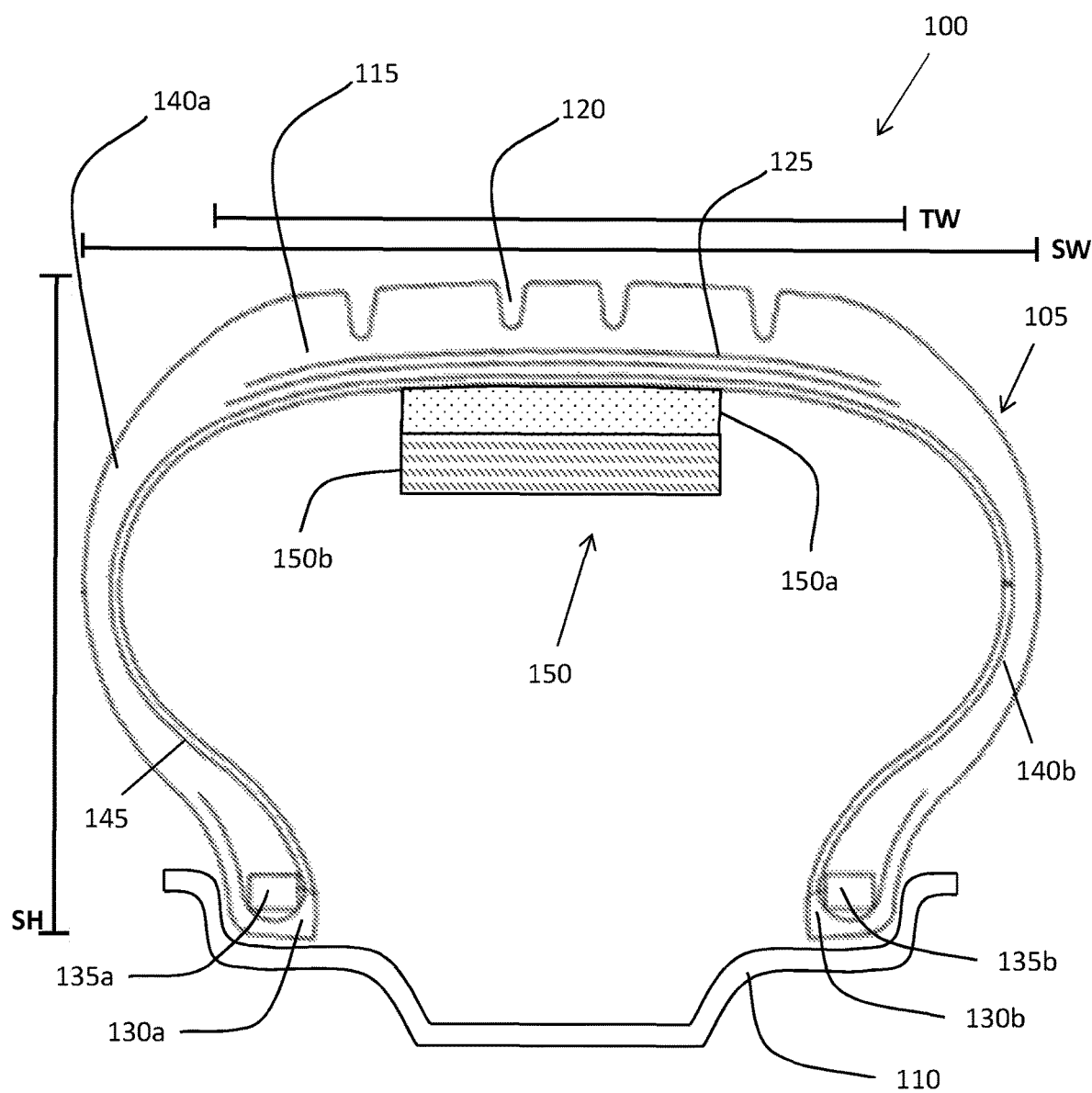
FIG. 1 is a cross-section of one embodiment of a noise reduction system including an exemplary tire with one embodiment of a noise damper.

FIG. 1 is a cross-section of one embodiment of a noise-reduction system 100 for a vehicle wheel assembly. The system 100 includes a tire 105 mounted on a wheel 110. The tire 105 has a section height SH, measured from a heel to a radially outermost portion of the tire. The tire 105 also has a section width SW and a tread width TW. In the illustrated embodiment, the tire 105 is a passenger tire, but it should be understood that the tire may be a high performance tire, light-truck, or truck-and-bus-radial tire. In other embodiments, the tire may be an agricultural tire or off the road tire.

The tire 105 includes a circumferential tread 115 in a crown region of the tire. In the illustrated embodiment, the tread 115 includes a plurality of circumferential grooves 120. While four grooves 120 are shown, it should be understood that any number of grooves may be employed. The tread 115 may further include ribs, blocks, lugs, lateral grooves, sipes, or any other tread elements. The crown region of the tire 105 further includes a pair of belts 125. In alternative embodiments (not shown), any number of belts or cap plies may be employed.

In the illustrated embodiment, the tire 105 further includes a first bead portion 130a and a second bead portion 130b. The bead portions 130a,b include a first bead 135a and a second bead 135b, which are shown schematically in FIG. 1. The bead portions 130a,b may also include one or more bead fillers (not shown) and other known components such as abrasions, chafers, and reinforcements.

A first sidewall 140a extends between the tread 115 and the first bead portion 130a. Similarly, a second sidewall 140b extends between the tread 115 and the second bead portion 130b. The sidewalls 140a,b may include any number of reinforcements (not shown). A carcass ply 145 extends from the first bead portion 130a, through the first and second sidewalls 140a and the crown portion, to the second bead portion 130b. In alternative embodiments (not shown), any number of carcass plies may be employed.

With continued reference to FIG. 1, a noise damper 150 including a first tier 150a and a second tier 150b is disposed in a cavity formed by the tire 105 and wheel 110. The first tier 150a is an upper tier that is adhered to the tire 105 with an adhesive. The second tier 150b is a lower tier that is adhered to the first tier 150a with an adhesive. The adhesive may be in the form of adhesive tape, or it may be bead glue or other liquid adhesive. In the illustrated embodiment each of the tiers 150a,b has a rectangular cross-section. However, it should be understood that the noise dampers may have any geometric shape.

In one embodiment, the damper 150 forms a continuous loop about the tire. In an alternative embodiment, the damper 150 includes a series of dampers placed about the tire. In such an embodiment, the series of dampers may be spaced apart from each other, or in contact with each other.

In one embodiment, the noise damper 150 is a foam body constructed of compressible and elastic open cell foam material. Exemplary foam materials include, without limitation, polyurethane, polyester, polyether, melamine fiberglass, and rock wool. In an alternative embodiment, the noise damper is made of fibers or fibrous materials. In one embodiment, the first tier 150a and the second tier 150b are constructed of the same material. In an alternative embodiment, the first tier 150a and the second tier 150b are constructed of different materials. For example, the first tier 150a may be made of polyurethane while the second tier 150b is made of melamine.

In either embodiment, the noise damper 150 has a sound absorption coefficient between 0.4 and 1.2. In an alternative embodiment, the noise damper 150 has a sound absorption coefficient of less than 0.4. In one particular embodiment, the noise damper 150 has a sound absorption coefficient of between 0.05 and 0.15, which is known to be an effective sound absorption coefficient of noise at a frequency of about 250 Hz. The damper 150 is also configured to reduce noise having a frequency between 180-220 Hz. In another particular embodiment, the noise damper 150 has a sound absorption coefficient between 0.7 and 1.2.

The first tier 150a has a radial height that is 1.5-14.0% of the section height SH and an axial width that is 20-80% of the tread width TW. In another embodiment, the first tier 150a has a radial height that is 3.0-14.0% of the section height SH and an axial width that is 20-70% of the tread width TW. In one particular embodiment, the first tier 150a has a radial height that is 3.0-8.0% of the section height SH.

The second tier 150b likewise has a radial height that is 1.5-14.0% of the section height SH and an axial width that is 20-80% of the tread width TW. In another embodiment, the second tier 150b has a radial height that is 3.0-14.0% of the section height SH and an axial width that is 20-70% of the tread width TW. In one particular embodiment, the second tier 150b has a radial height that is 6.0-10.0% of the section height SH. In another particular embodiment, the second tier 150b has a radial height that is 3.0-12.0% of the section height SH and an axial width that is 20-70% of the tread width TW. In another particular embodiment, the second tier 150b has a height of 1.5-3.0 cm.

Figure 2:
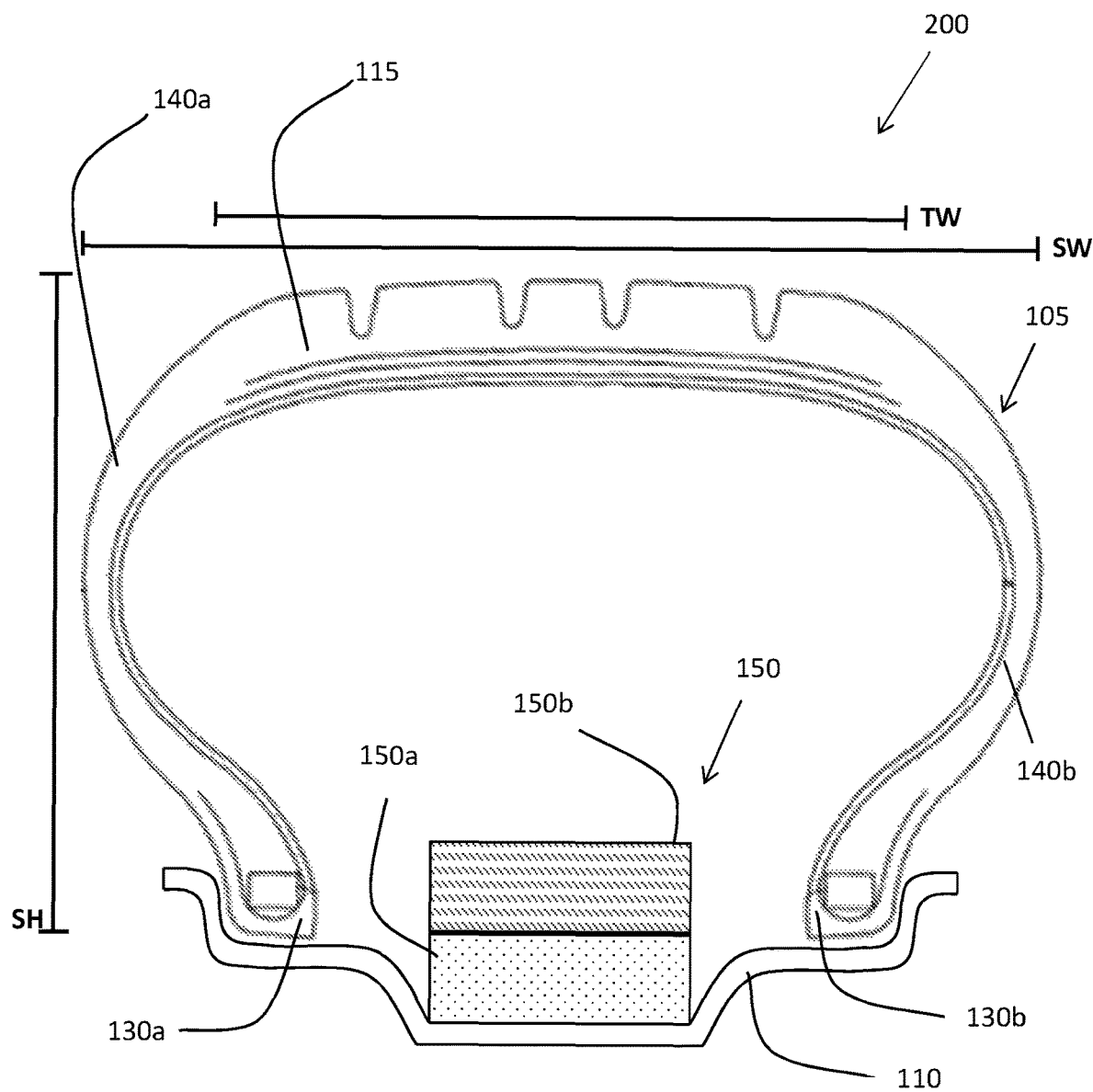
FIG. 2 is a cross-section of an alternative embodiment of a noise reduction system including the exemplary tire with an alternative placement of the noise damper.

FIG. 2 is a cross-section of an alternative embodiment of a noise reduction system 200 including the exemplary tire 105 with the noise damper 150 placed in an alternative location. The tire 105 is the same as the tire 105 discussed above with respect to FIG. 1.

The damper 150 is substantially the same as that described above with respect to FIG. 1, except for the differences in location and orientation discussed below. The noise damper 150 includes a first tier 150a and a second tier 150b. The first tier 150a is a lower tier that is adhered to the wheel 110 with an adhesive. The second tier 150b is an upper tier that is adhered to the first tier 150a with an adhesive. In the illustrated embodiment each of the tiers

150*a,b* has a rectangular cross-section. However, it should be understood that the noise dampers may have any geometric shape.

The damper 150 may be constructed of the same material and have the same dimensions as discussed above with respect to FIG. 1.

Figure 3A:
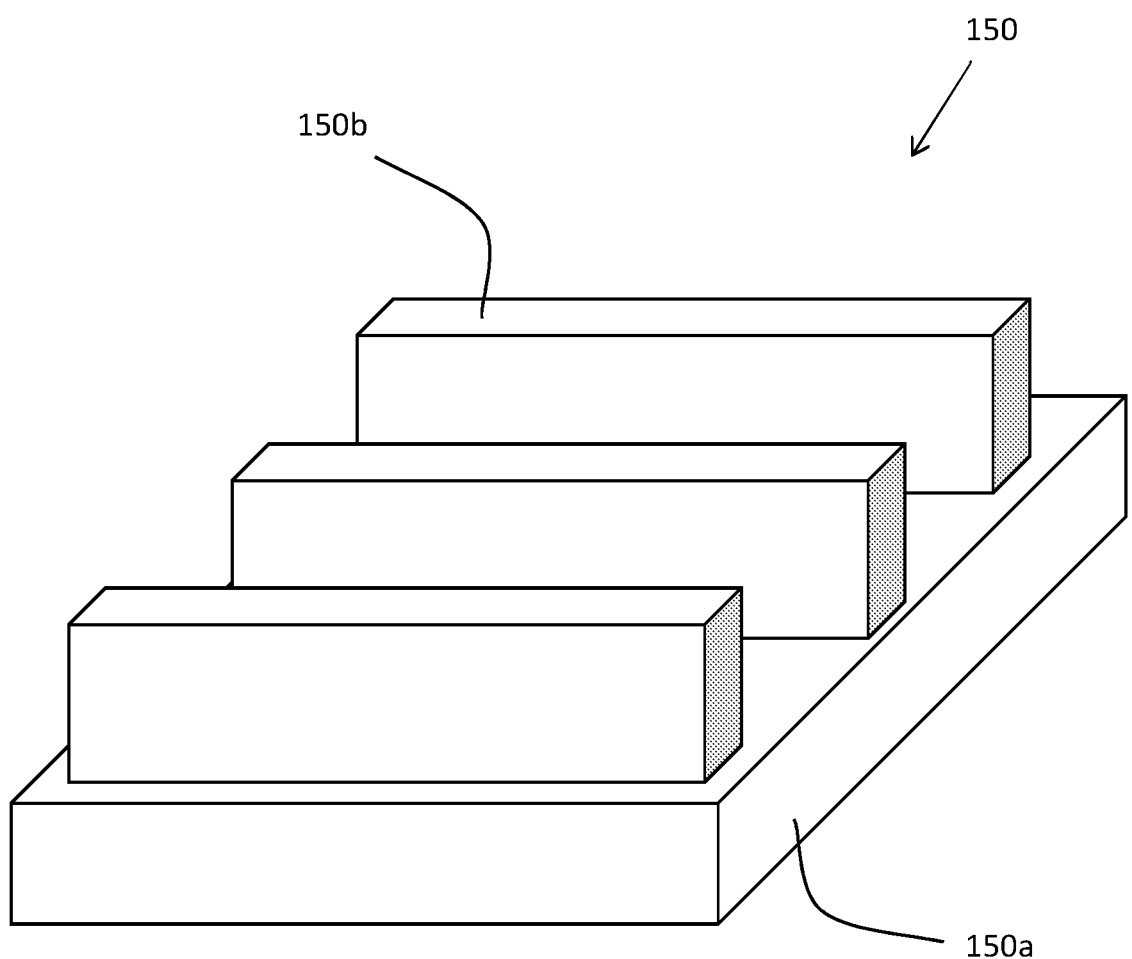
FIG. 3A is a perspective view of the noise damper.

FIG. 3A is a perspective view of a portion of one embodiment of the noise damper 150. The noise damper 150 includes the first tier 150*a* and the second tier 150*b*. The first tier 150*a* can be adhered to a crown region of a tire, in the manner shown in FIG. 1, or it can be adhered to a wheel of a tire as shown in FIG. 2. Different adhesives may be employed, depending on whether the damper is adhered to a tire or to a wheel.

The second tier 150*b* is a lower tier when the first tier 150*a* is adhered to a crown region of the tire, as shown in FIG. 1. The second tier 150*b* is an upper tier when the first tier 150*a* is adhere to a wheel. The second tier 150*b* includes a plurality of spaced apart blocks. In one embodiment, the blocks are adhered to the first tier 150*a* by an adhesive. In an alternative embodiment, the blocks are formed by cutting or otherwise removing material from the noise damper 150 to form the blocks. In another alternative embodiment, the blocks are formed on top of the first tier 150*a* by an additive manufacturing process.

In the illustrated embodiment, the blocks are rectangular cuboids. That is, each block is a polyhedron bounded by six quadrilateral faces. Each block has substantially the same axial width as the axial width of the first tier 150*a*. In alternative embodiments, the axial width of each block is 80-120% of the axial width of the first tier 150*a*.

In one embodiment, each block has the same width. In an alternative embodiment, the widths of the blocks vary. In one such embodiment, the widths of the block may be selected to balance the weight of the tire.

The blocks are separated by voids, such that the blocks span 20-40% of the length of the first tier 150*a* and the voids span 60-80% of the length of the first tier 150*a*. Thus, when the damper 150 is connected to the crown region of the tire, the blocks span 20-40% of the inner circumference of the first tier 150*a*. When the damper 150 forms a continuous loop connected to the wheel, the blocks span 20-40% of the outer circumference of the first tier 150*a*.

In an alternative embodiment, the blocks span 10-40% of the length of the first tier 150*a* and the voids span 60-90% of the length of the first tier 150*a*. In another alternative embodiment, the blocks span 10-30% of the length of the first tier 150*a* and the voids span 70-90% of the length of the first tier 150*a*.

The spacing of the blocks may be selected based on harmonics of the tire. For example, a tire of a given size and construction may produce noise at a first harmonic when it rotates at a first speed, produce a noise at a second harmonic when it rotates at a second speed, etc. The blocks can be spaced to disrupt such harmonic waves and thus further aid in noise reduction.

Figure 3B:
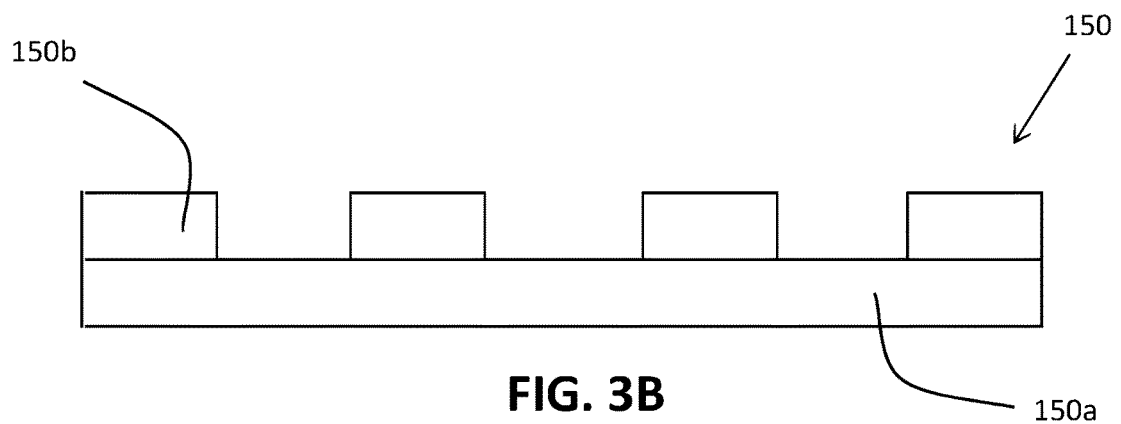
FIG. 3B is a side view of the noise damper.

FIG. 3B is a side view of the noise damper 150. As can be seen in this view, the blocks are equally spaced on the first tier 150*a*. The height of each block is substantially the same as the height of the first tier 150*a*. Each of the blocks has substantially the same height.

Figure 4:
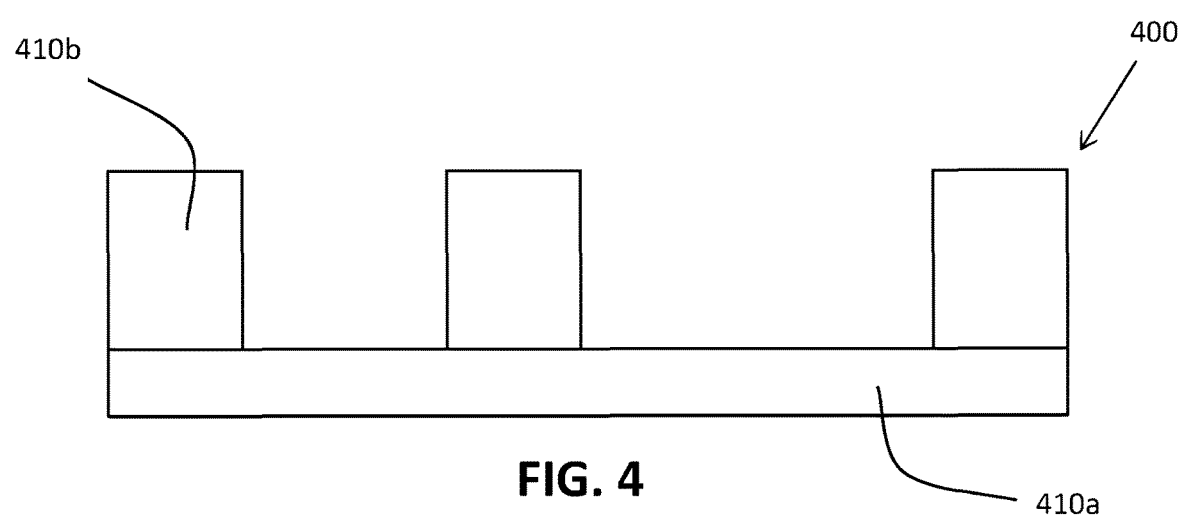
FIG. 4 is a side view of an alternative embodiment of a noise damper.

FIG. 4 is a side view of an alternative embodiment of a noise damper 400. The damper 400 is substantially the same as the damper 150 described above, except for the differences described herein. The damper 400 may be placed in a tire cavity according to any of the manners described above.

The damper 400 includes a first tier 410*a* and a second tier 410*b* that is formed by a plurality of blocks. In this embodiment, the blocks are pitch sequenced. In other words, the spacing between the blocks varies. The spacing may be selected based on the harmonics of the tire, or for purposes of balancing the weight of the tire.

In the illustrated embodiment, the height of the second tier 410*b* is greater than the height of the first tier 410*a*, and each block has substantially the same height. In an alternative embodiment, the height of the second tier is the same as the height of the first tier, and each block has substantially the same height. In another alternative embodiment, the heights of the blocks vary.

Figure 5:
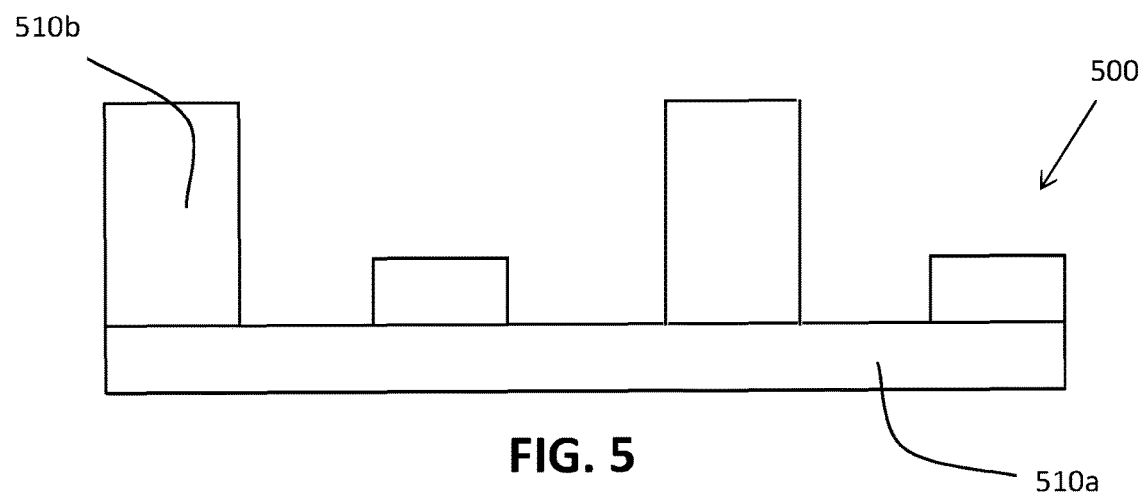
FIG. 5 is a side view of another alternative embodiment of a noise damper.

FIG. 5 is a side view of another alternative embodiment of a noise damper 500. The damper 500 is substantially the same as the damper 150 described above, except for the differences described herein. The damper 500 may be placed in a tire cavity according to any of the manners described above.

The damper 500 includes a first tier 510*a* and a second tier 510*b* that is formed by a plurality of blocks. In this embodiment, the blocks are equally spaced from each other. In an alternative embodiment, the blocks may be pitch sequenced.

In the illustrated embodiment, the second tier 510*b* is formed by two block types, including blocks having a first height and blocks having a second height. The block types are alternated, such that a tall block is disposed between two short blocks. In an alternative embodiment, blocks of three or more heights are employed. The blocks of multiple heights may be arranged in any order. The arrangement of the blocks may be selected based on the harmonics of the tire or to balance the weight of the tire.

Figure 6:
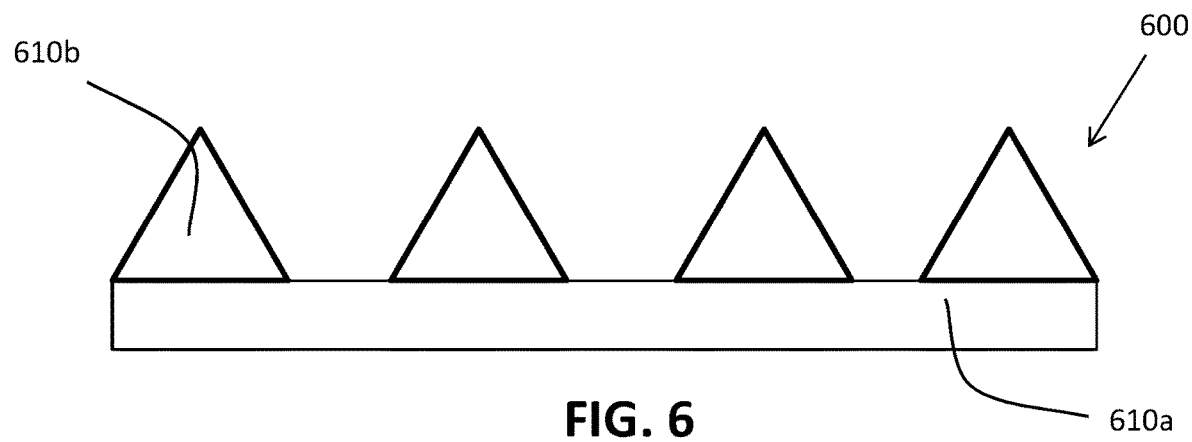
FIG. 6 is a side view of yet another alternative embodiment of a noise damper.

FIG. 6 is a side view of yet another alternative embodiment of a noise damper 600. The damper 600 is substantially the same as the damper 150 described above, except for the differences described herein. The damper 600 may be placed in a tire cavity according to any of the manners described above.

The damper 600 includes a first tier 610*a* and a second tier 610*b* that is formed by a plurality of blocks. In this embodiment, the blocks are equally spaced from each other. In an alternative embodiment, the blocks may be pitch sequenced.

In the illustrated embodiment, the second tier 610*b* is formed by blocks having a triangular cross-section. Each block has substantially the same height, and the blocks are taller than the first tier 610*a*. In an alternative embodiment, the blocks have the same height as the first tier 610*a*. In another alternative embodiment, the blocks have a height less than the height of the first tier 610*a*. In yet another alternative embodiment, the height of the blocks vary.

Figure 7:
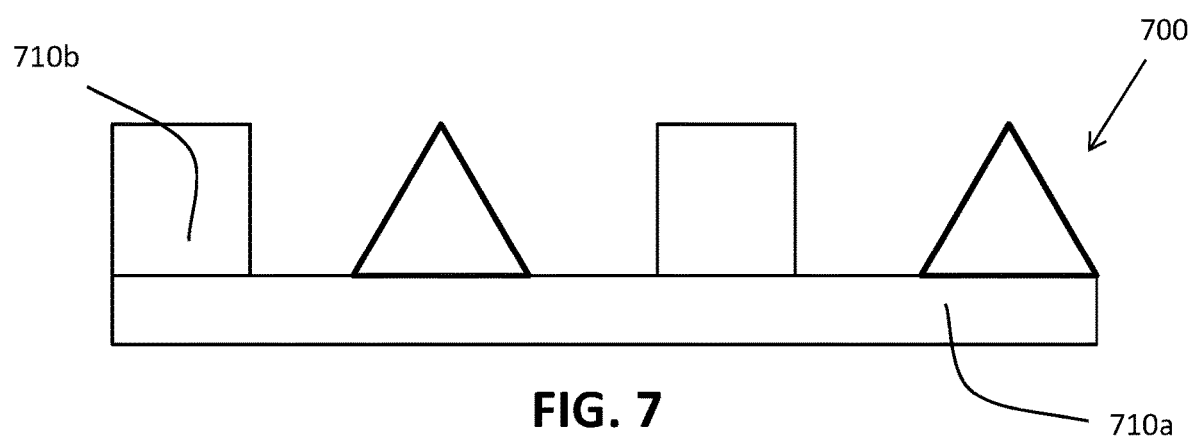
FIG. 7 is a side view of still another alternative embodiment of a noise damper.

FIG. 7 is a side view of still another alternative embodiment of a noise damper 700. The damper 700 is substantially the same as the damper 150 described above, except for the differences described herein. The damper 700 may be placed in a tire cavity according to any of the manners described above.

The damper 700 includes a first tier 710*a* and a second tier 710*b* that is formed by a plurality of blocks. In this embodiment, the blocks are equally spaced from each other. In an alternative embodiment, the blocks may be pitch sequenced.

In the illustrated embodiment, the second tier 710*b* is formed by a first plurality of blocks having a triangular cross-section and a second plurality of blocks having a rectangular cross-section. In the illustrated embodiment, the blocks are arranged in an alternating pattern, such that a rectangular block is disposed between two triangular blocks. In alternative embodiments, the blocks may be arranged in any desired order.

Each block has substantially the same height, and the blocks are taller than the first tier 710a. In an alternative embodiment, the blocks have the same height as the first tier 710a. In another alternative embodiment, the blocks have a height less than the height of the first tier 710a. In yet another alternative embodiment, the height of the blocks vary.

Figure 8:
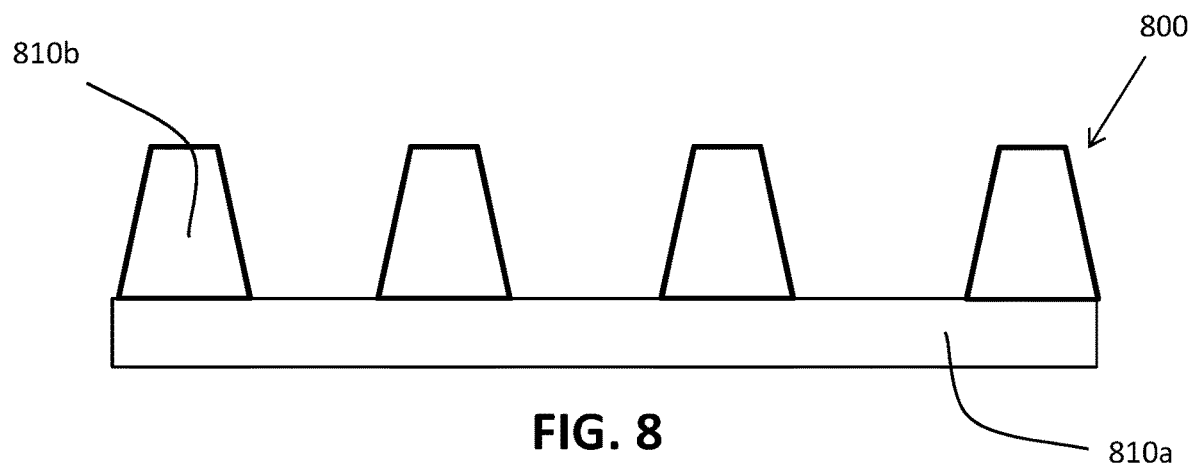
FIG. 8 is a side view of yet another alternative embodiment of a noise damper.

FIG. 8 is a side view of yet another alternative embodiment of a noise damper 800. The damper 800 is substantially the same as the damper 150 described above, except for the differences described herein. The damper 800 may be placed in a tire cavity according to any of the manners described above.

The damper 800 includes a first tier 810a and a second tier 810b that is formed by a plurality of blocks. In this embodiment, the blocks are equally spaced from each other. In an alternative embodiment, the blocks may be pitch sequenced.

In the illustrated embodiment, the second tier 810b is formed by blocks having a trapezoidal cross-section. In the illustrated embodiment, each block has the same geometric cross-section. In an alternative embodiment, the cross-sections of the blocks may vary.

Each block has substantially the same height, and the blocks are taller than the first tier 810a. In an alternative embodiment, the blocks have the same height as the first tier 810a. In another alternative embodiment, the blocks have a height less than the height of the first tier 810a. In yet another alternative embodiment, the height of the blocks vary.

In any of the above-described embodiments, one or more of the blocks may have a leading edge constructed of a different material. The leading edge material may be a polymer with a Rockwell hardness of up to 100 HRR. The leading edge material may be polyethylene, polypropylene, or another polymeric material. The leading edge may have pores. In one particular embodiment, the leading edge includes flaps.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative system and method, and illustrative examples shown and described. Accordingly, departures may be made from such details without departing from the spirit or scope of the applicant's general inventive concept.

What is claimed is:

1. A tire and noise damper assembly comprising:
   a tire, wherein the tire comprises:
      a first annular bead and a second annular bead,
      a body ply extending between the first annular bead and the second annular bead,
      an innerliner, disposed radially under the body ply and extending axially across a portion of the body ply,
      an annular belt package, disposed radially upward of the body ply and extending axially across a portion of the body ply,
      a circumferential tread disposed radially upward of the annular belt package and extending axially across a portion of the body ply, and
      a first sidewall extending between the first annular bead and a first shoulder, the first shoulder being associated with the circumferential tread, and a second sidewall extending between the second annular bead and a second shoulder, the second shoulder being associated with the circumferential tread; and
   a noise damper having a continuous circumferential upper tier and an adjacent circumferential lower tier including blocks and voids,
      wherein the blocks of the lower tier are made of at least a first material that is an open cell foam,
      wherein the blocks of the lower tier include a plurality of first blocks having a first block height and a plurality of second blocks having a second block height that is different from the first block height,
      wherein the circumferential lower tier has a radial height that is 1.5-14.0% of a section height of the tire and an axial width that is 20-80% of a tread width of the tire,
      wherein the continuous circumferential upper tier has a radial height that is 1.5-14.0% of the section height and an axial width that is 20-80% of the tread width, and
      wherein the blocks span 10-30% of the continuous circumferential upper tier's inner circumference and the voids span 70-90% of the continuous circumferential upper tier's inner circumference,
      wherein each of the blocks includes a leading edge made of a second material different from the first material, and
      wherein the second material is a polymer with a Rockwell hardness of up to 100 HRR.

2. The tire and noise damper assembly of claim 1, wherein the circumferential lower tier has a radial height that is 6.0-10.0% of the section height.

3. The tire and noise damper assembly of claim 1, wherein the first material is selected from the group consisting of polyurethane, polyester, polyether, melamine fiberglass, and rock wool, and the second material is selected from the group consisting of polyethylene and polypropylene.

4. The tire and noise damper assembly of claim 1, further comprising an adhesive that secures the continuous circumferential upper tier to the circumferential lower tier.

5. The tire and noise damper assembly of claim 1, further comprising an adhesive that secures the noise damper to the tire.

6. The tire and noise damper assembly of claim 1, wherein the blocks are pitch sequenced.

7. The tire and noise damper assembly of claim 1, wherein the noise damper has a trapezoidal cross section.

8. The tire and noise damper assembly of claim 1, wherein the noise damper further includes fibers.

9. The tire and noise damper assembly of claim 1, wherein the first material has a sound absorption coefficient between 0.7 and 1.2.

10. The tire and noise damper assembly of claim 1, wherein the noise damper assembly reduces noise having a frequency between 180-220 Hz.

\* \* \* \* \*